United States Patent [19]

Drucker

[11] Patent Number: 5,600,930
[45] Date of Patent: Feb. 11, 1997

[54] CONSTRUCTION SYSTEM USING LIGHTWEIGHT FIRE-RESISTANT PANELS

[76] Inventor: Ernest R. Drucker, 226 Searle Avenue, North York, Ontario, Canada, M3H 4B9

[21] Appl. No.: 609,005

[22] Filed: Feb. 29, 1996

Related U.S. Application Data

[63] Continuation-in-part of Ser. No. 419,281, Apr. 10, 1995.
[51] Int. Cl.$^6$ ............................................. E04B 2/50
[52] U.S. Cl. ................. 52/585.1; 52/220.3; 52/586.2; 52/793.1; 52/794.1; 52/797.1; 52/801.1
[58] Field of Search ................... 52/220.2, 220.3, 52/585.1, 586.1, 586.2, 793.1, 794.1, 797.1, 801.1; 403/205, 382, 403, 231

[56] References Cited

U.S. PATENT DOCUMENTS

| | | |
|---|---|---|
| 2,806,509 | 9/1957 | Bozzacco et al. . |
| 3,908,062 | 9/1975 | Roberts ........................... 428/282 |
| 4,562,109 | 12/1985 | Harvey et al. ........................... 428/220 |
| 4,665,678 | 5/1987 | Müller et al. ........................... 52/808 |
| 4,671,028 | 6/1987 | Figone ........................... 52/108 |

*Primary Examiner*—Carl D. Friedman
*Assistant Examiner*—Yvonne Horton-Richardson

[57] ABSTRACT

A fire-resistant construction system is described comprising lightweight rigid panels forming structural walls, ceilings or partitions and connector members for joining the rigid panels to form a structure. Each rigid panel has substantial length and width relative to thickness and is formed of small ceramic or glass hollow microspheres having particle sizes of less than about 2 mm and a density of less than about 0.75 g/cc. These small microspheres are bonded together to form a rigid panel by means of a settleable binder material, and each panel also has a plurality of equally spaces holes formed therein and extending the full length of the panel. Each connector member comprises an L-shaped member with each arm of the L-shaped member having tubular sleeves extending perpendicularly therefrom and being adapted to fit snugly within the holes of the rigid panels.

32 Claims, 5 Drawing Sheets

CONSTRUCTION SYSTEM USING LIGHTWEIGHT FIRE-RESISTANT PANELS

It is a continuation-in-part of U.S. application Ser. No. 08/419,281, filed Apr. 10, 1995.

BACKGROUND OF THE INVENTION

1. Field of the Invention

This invention relates to lightweight, panels useful in building construction, particularly to such panels of a fire-resistant nature which are useful in constructing walls, partitions and ceilings, to methods of producing the panels and construction methods using the panels.

2. Description of the Prior Art

Over the years, many attempts have been made to create lightweight rigid panels for use in constructing permanent or demountable partitions or walls in homes and commercial buildings. With modern highrise construction, it has become even more necessary than ever before to use panels of a type which exhibit good fire-resistance so that they will pass the requisite fire tests and will withstand the conditions to which they are subjected during intense fires in such buildings. Gypsum material has long been utilized in the formation of panels for resisting fire. Gypsum is today typically used in the form of drywall made of gypsum wallboard panels fastened to a supporting skeletal structure or framework formed of wood or metal members. The gypsum wallboard generally comprises a core of gypsum having on its outer surface a layer of relatively heavy kraft paper. In a fire, the paper may support combustion for a limited period of time, but the gypsum core resists the fire while releasing its water of hydration and therefore has a fairly predictable burn-through time during which it prevents the passage of fire.

Attempts have been made to create composite panels having a core of fire resistant material with a very thin layer of gypsum on each surface thereof. One such composite panel is described in Roberts U.S. Pat. No. 3,908,062 issued Sep. 23, 1975. That composite panel includes a rigid core of bonded mineral fiber material with a very thin layer of gypsum material on each surface thereof. The gypsum layer is preferably no more than about ⅛ inch (3 mm) thick and the complete composite board is typically of the thickness of a usual gypsum drywall panel.

Various other types of composite or sandwich constructions have been attempted in building construction and, for instance, Harvey et al U.S. Pat. No. 4,562,109 issued Dec. 31, 1985 describes a crack resistant coating for masonry structures comprising a trowelable mixture of a resin binder and glass beads. The glass beads used for this purpose had an average diameter of about 4 mm. A convention coating layer was applied on top of the crack absorbing layer containing the glass beads.

U.S. Pat. No. 2,806,509, issued Sep. 17, 1957, describes the fabrication of laminated sandwich panels in which hollow beads coated with a heat-tackifiable resin and a powdered metal is placed between outer skins and is then heated and compressed to compact the beads and gel the resin. Panels produced in this manner had a density of about 25 to 75 pounds per cubic foot.

It is the object of the present invention to develop a construction system using lightweight panels of substantial thickness which would be capable of comprising a complete wall or partition structure such as to eliminate any supporting skeletal structure or framework formed of wood or metal members. In other words, it would be capable of forming a complete wall or partition.

SUMMARY OF THE INVENTION

The present invention relates to a fire-resistant construction system comprising lightweight rigid panels forming structural walls, ceilings or partitions and connector members for joining the rigid panels to form a structure. Each rigid panel has substantial length and width relative to thickness and is formed of small ceramic or glass hollow microspheres having particle sizes of less than about 2 mm and a density of less than about 0.75 g/cc. These small microspheres are bonded together to form a rigid panel by means of a settleable binder material, and each panel also has a plurality of equally spaces holes formed therein and extending the full length of the panel. Each connector member comprises an L-shaped member with each arm of the L-shaped member having tubular sleeves extending perpendicularly therefrom and being adapted to fit snugly within the holes of the rigid panels.

The rigid core of bonded microspheres can vary quite widely in thickness and typically has a thickness in the range of about 5 to 15 cm. The equally spaced holes in each panel are preferably cylindrical and the cross-sectional area of the holes in a panel preferably comprise at least 25% of the total cross-sectional area of a panel. Preferably there is at least about 2 cm of rigid panel material between the periphery of each hole and the outer face of the panel. The panels can be manufactured in a wide variety of convenient lateral dimensions, e.g. 120 cm×240 cm, etc.

The construction panels according to this invention are surprisingly light and rigid. The core density can vary considerably, e.g. in the range of 10 to 25 pounds per cubic foot, depending upon the amount of binder material that is used and the wall thickness of the microspheres. The microspheres preferably have a density in the range of about 0.15 to 0.6 g/cc with diameters preferably in the range of about 10 to 200 μm. The wall thicknesses of the microsphere may vary quite widely between about 0.5 and 2.0 μm depending upon the compressive strength that may be required in the panels. The microspheres have compressive strengths in the range of about 250 to 10,000 psi.

The lightweight rigid panels of this invention can be adapted for use as structural walls, ceilings or partitions for structures. The density of the panels varies with the structural requirements with the stronger panels being of necessity of higher density than the weaker panels. For instance, panels for use in partitions typically have densities of about 15 pounds per cubic foot, while panels for forming structural walls or ceilings may have densities up to 25 pounds per cubic foot. These variations are based upon the density of the microspheres that are used as well as the type and amount of settleable binder material required.

Particularly for panels according to the invention used as ceiling structures, it is preferable to include steel reinforcing bars within the panels. These reinforcing bars are spaced about 12 mm to 20 mm depending upon the actual ceiling span and the live load to be carried by the ceiling.

The microspheres that are used according to the present invention are well known materials and glass microspheres are generally preferred over ceramic microspheres because the glass microspheres are lighter and less expensive while at the same time meeting all fire resistance and strength requirements. As examples of commercially available microspheres suitable for the present invention there may be mentioned SCOTCHLITE® glass bubbles from 3M, Q-CEL® hollow microspheres available from the PQ Corporation, Z-LIGHT SPHERES® available from Zeelan Industries Inc. and MICROMIX®, available from Americas Best Building Products.

A wide variety of settleable binder materials may be used for bonding together the microspheres and bonding the gypsum wallboards to the core. The binder is preferably applied as a very thin coating on the outer surfaces of the microspheres and it may be an organic resin binder, e.g. a thermosetting resin binder. It is also possible to use an epoxy adhesive, a urea-based adhesive, etc. Examples of suitable binders include Hysol® epoxy adhesives from the Dexter Corporation, urea based adhesives from Reichhold and thermosetting resins from Ashland Chemicals and Owens Corning.

The surfaces of the rigid core are preferably faced with a cladding material, e.g. gypsum wallboard panels bonded to the core or fibreglass layers bonded to the core. The gypsum wallboards are typical commercial gypsum wallboard, e.g. wallboard having a thickness of about 10–12 mm. To assist in achieving a strong bond between the gypsum wallboard panels and the rigid core of bonded microspheres, the paper face of each gypsum wallboard panel adjacent the core is preferably perforated by a plurality of small holes extending through the paper and uniformly distributed over the entire surface of the panel. These perforations are typically of a diameter of up to about 2 mm with about 20 perforations being provided in each 5 mm×5 mm area of the panel. They permit the binder material to pass through the paper and into the gypsum, thereby greatly strengthening the bond between the core and the gypsum panels.

For an outside wall construction according to the invention, the core of microspheres is typically faced on the inside with a commercial gypsum wallboard panel and faced on the outside with a fibreglass layer. Spaced vertical straps are typically fixed to the fibreglass layer and these straps may provide an anchor for traditional exterior siding, such as aluminum or vinyl siding.

It is also possible to use the panels according to this invention as foundation walls. For that purpose, the outside of the panel is faced with an asphalt cover, while the inside of the panel is faced with a gypsum wallboard panel.

When the panels according to the invention are used for kitchens and bathrooms, it is preferable to bond a layer of aluminum to the exposed face of the gypsum wallboard panel to provide a water tight surface. A wide variety of coverings, such as ceramic tiles may then be applied over the aluminium layer.

It is has also been found that when the panels according to the invention are used as floor structures, hardwood flooring such as 3 inch hardwood flooring squares may be glued on the outer surface of the gypsum wallboard panel.

An important feature of this invention is the arrangement of equally spaced cylindrical holes extending the length of each rigid panel. These holes are preferably formed using a collapsible mould such that the holes contain no type of liner in the completed structure. The holes provide passageways for services, such as electrical conduits, etc., but also have the more important feature of providing the means for joining the rigid panels together into a structure. Thus, the L-shaped connector members have tubular sleeves adapted to fit snugly within the holes of the rigid panels. These connector members are typically formed of plastics, fibreglass or metal and form the connections between the ends of the panels. Thus, these connectors may be used for connecting ceiling panels to structural wall or partition panels, connecting structural wall or partition panels to a floor structure, etc. The single greatest problem in the use of panel members formed of hollow microspheres is that of providing a simple and strong connector for joining the panels together and joining the panels to other structures. The L-shaped connector members with the projecting tubular sleeves according to the present invention provide an excellent solution to that problem.

The present invention also relates to a novel process for producing the composite panel. The process comprises the steps of placing a first gypsum wallboard panel or fibreglass layer in a press mould and then dispensing onto this a layer of free flowing small ceramic or glass microspheres of the type described above, these microspheres being coated with a settleable binder material. A second gypsum wallboard panel or fibreglass layer is placed on top of the layer of coated microspheres and the assembly is then pressed together and the binder material is cured while pressing to form a composite construction panel.

In one embodiment, the coated microspheres are dispensed onto the first wallboard panel by storing the microspheres without binder coating in a hopper and dispensing these from a metered dispensing device positioned above the first gypsum wallboard panel. From the dispenser, the microspheres are permitted to fall through a fine spray of dilute bonding material so that the individual microspheres become coated with the bonding material. The coated microspheres collect on the first wallboard panel and are spread uniformly across the panel by vibrating the panel. When a sufficient thickness of coated microspheres has built up on the first wallboard panel, the second wallboard panel is placed on top of the layer of microspheres and the two wallboard panels and the core layer of coated microspheres are pressed together by any type of press capable of applying a uniform pressure, preferably a vacuum press. The pressing conditions may vary considerably, but it is typically done at pressures no greater than about 40 psi and temperatures not greater than about 90° C. Essentially, the diluted resin which surrounds the microspheres hardens under pressure and liquid evaporation (accelerated by heat) and forms a rigid light mass of microspheres also firmly bonded to the perforated wallboard. Curing times vary widely depending on the nature of the bonding agent used, the degree of dilution, curing temperatures and pressures, etc., but many panels can be cured within about ½ hour.

According to another preferred embodiment, the microspheres are mixed with a bonding agent to provide a coating of bonding agent over the surface of the microspheres. The coating on the microspheres is dried so that the coated microspheres may be stored in free flowing form. When a panel is to be formed, these coated microspheres then flow from a dispenser into the mould for forming the rigid panels.

It is important to apply the correct amount of settleable binder resin to the microspheres. The resin is preferably diluted with a solvent before application and it is important that substantially all of the microspheres be coated with the diluted resin. A wide variety of solvents may be used for this purpose and it is preferred to use a solvent which has a flame retardant capability. The resin is typically diluted to about 25 to 40% by volume, with the courser the microspheres the greater the possible dilution. Of course, the greater is dilution of the resin the lighter is the final product. In order to assure that substantially all microspheres are so coated, it is usually necessary to use the diluted resin in an amount of at least 20% by volume based on the volume of microspheres being coated. If too little diluted resin is used, some microspheres may not be coated, resulting in loose microspheres within the rigid core causing weak spots. Excessive amounts of resin may penetrate too far into the gypsum wallboard, causing unsightly discolorations.

Another important feature of the present invention is the manner of forming the equally spaced holes in the rigid panels. Since one of the objects of the present invention is to make the rigid panels as lightweight as possible, a significant feature of the construction method of this invention is the use of collapsible moulds for forming the holes. These collapsible moulds comprise fiber reinforced collapsible plastic tubes which when inflated form regular cylinders. These collapsible tubes are placed in the mould and are connected to an air manifold and inflated to form a series of tubes or cylinders which become the moulds for the plurality of equally spaced holes. At the completion of the moulding procedure, the air pressure is removed, allowing the cylinders to collapse for removal. Thus, the completed lightweight rigid panels contain a plurality of equally spaced cylindrical holes without any liners in these holes.

BRIEF DESCRIPTION OF THE DRAWINGS

Certain preferred embodiments of this invention are illustrated by the accompanying drawings, in which.

DESCRIPTION OF THE PREFERRED EMBODIMENTS

Figure 1:
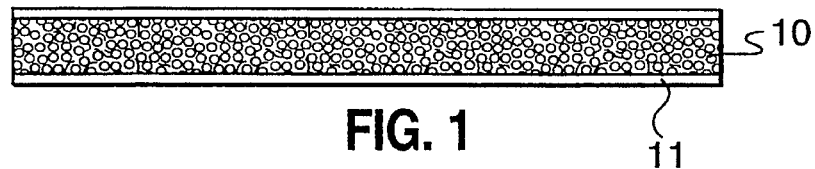
FIG. 1 is a side elevation of a composite panel according to the invention.
Figure 2:
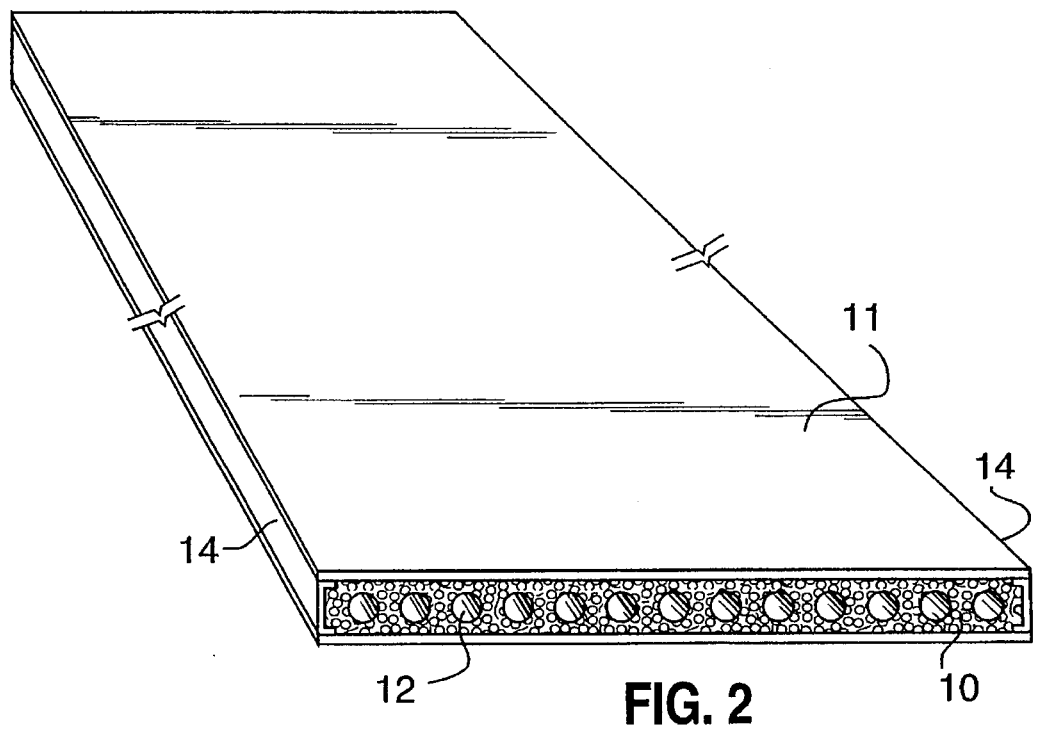
FIG. 2 is an isometric view of an alternative form of panel.

Referring now to the drawings, FIG. 1 shows a typical composite panel according to the invention with a rigid core 10 of bonded small ceramic or glass hollow microspheres and a gypsum wallboard panel 11 bonded to each face thereof. As can be seen from FIG. 2, a typical panel according to the invention has a plurality of equally spaced cylindrical holes 12 extending therethrough. These holes 12 serve the important function of providing sockets for connector means as well as serving as conduits for building services. The edges of the panels may be finished by means of fibreglass edge strips 14.

Figure 3:
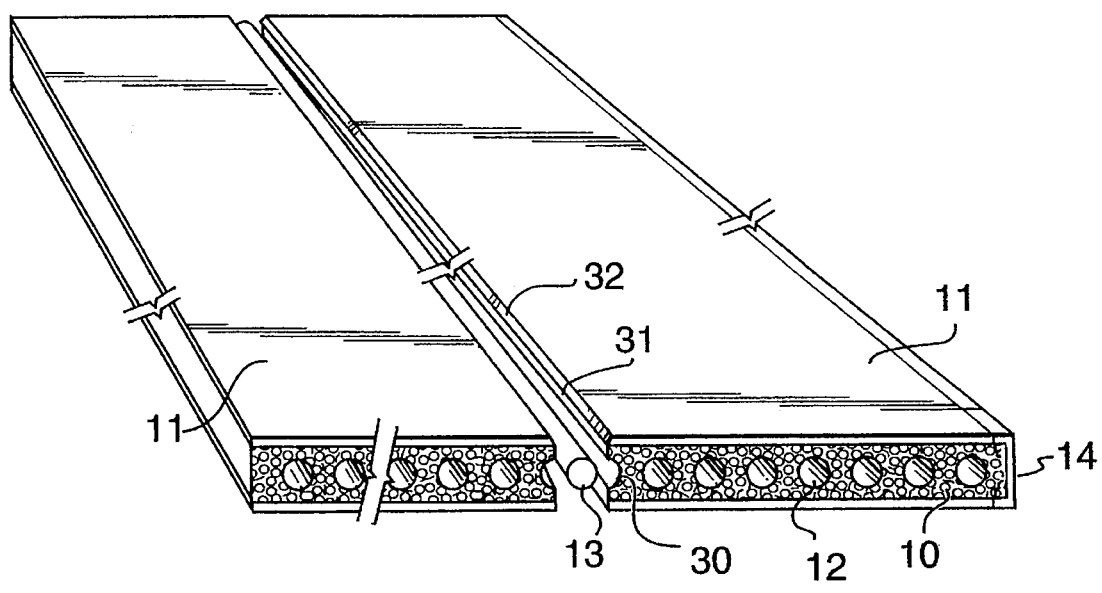
FIG. 3 is a further isometric view of a panel.

FIG. 3 shows an arrangement for joining two panels in which the joining edge of a panel includes a semi-cylindrical recess 30, two narrow longitudinal edge strips 31 above and below the semi-cylindrical recess 30 and small bevelled faces 32. For joining together the two panels 11, an epoxy glue is placed on the two semi-cylindrical surfaces 30 and a connecting or bonding fibreglass tube 13 is placed in position and the two panels 11 are pressed together so that there is a bond formed between the semi-cylindrical surfaces 30 and the tube 13. When the joining is completed, the bevelled edges 32 form a V-groove at the joint which may then be filled with filler to create a smooth joint between the panels.

Figure 4:
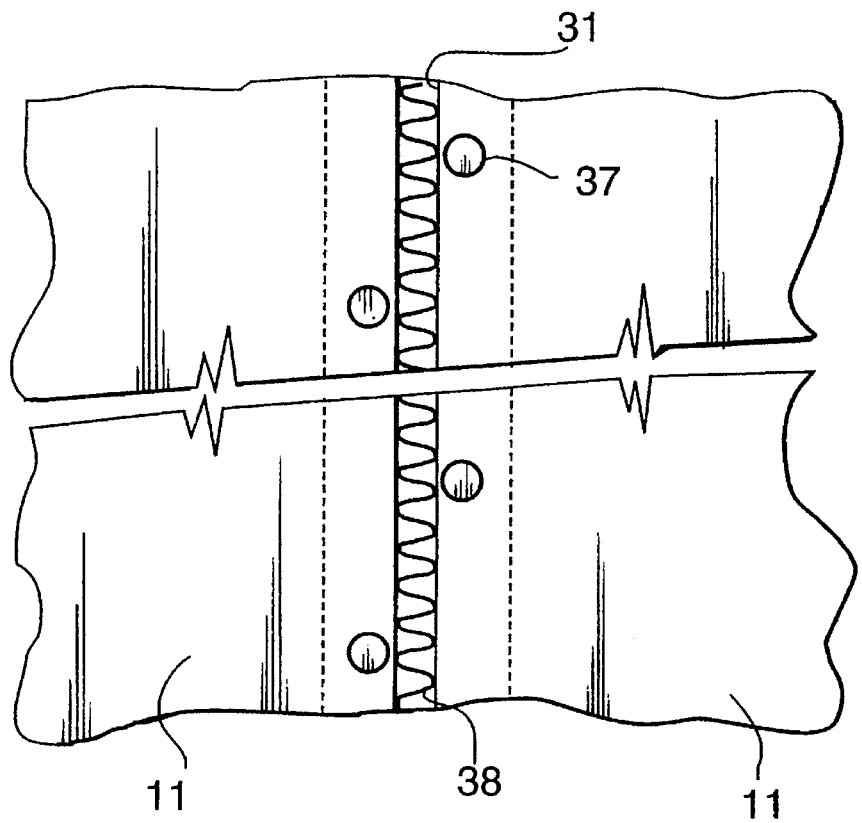
FIG. 4 is a plan view joined panels.
Figure 5:
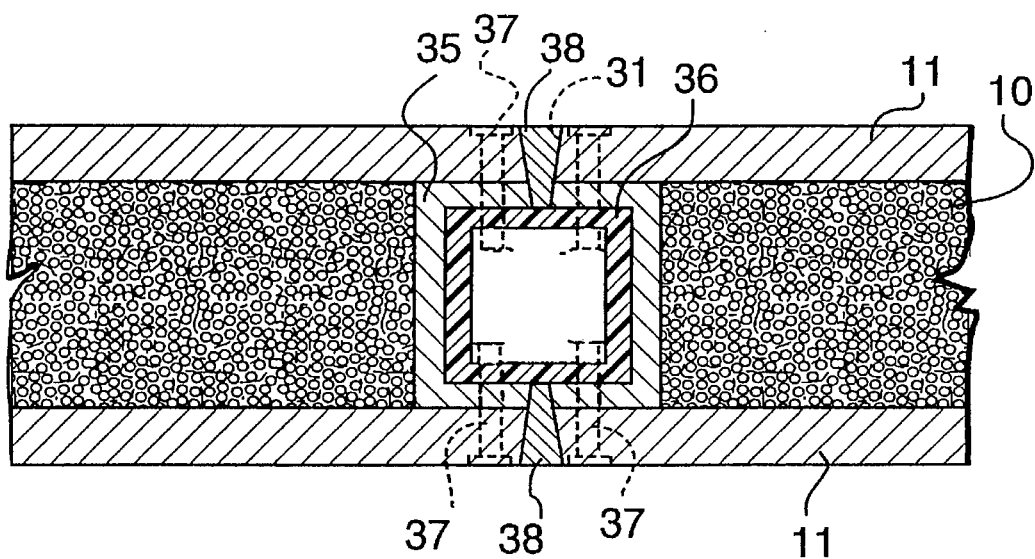
FIG. 5 is a sectional view of the panel joint of FIG. 4.

FIGS. 4 and 5 show another embodiment for connecting a pair of panels according to the present invention in an abutting relationship. In this embodiment, along the edge of each panel to be joined, a U-shaped fibreglass strip 35 with 90° corners is placed between the gypsum wallboard panels 11 with the bottom edge of the U-shaped member abutting the core 10. This U-shaped strip 35 is firmly bonded in place along the faces thereof contacting the gypsum panels 11 and the core 10. The edges of the gypsum panels 11 are preferably formed with a slight bevel 31, providing a substantially V-shaped gap between abutting composite panels of the invention.

In order to join two panels together utilizing the arrangement of FIGS. 4 and 5, a square extruded fibreglass column 36 is located within the U-shaped edge strips 35 and the edge strips 35 and the column 36 are joined together by means of a series of aluminum screws 37 which extend through the gypsum panels 11, the U-shaped edge piece 35 and the column 36. With the screws 37 firmly in place, the V-shaped grooves formed by the bevel faces 31 are filled with gypsum putty to complete the assembly.

Figure 7:
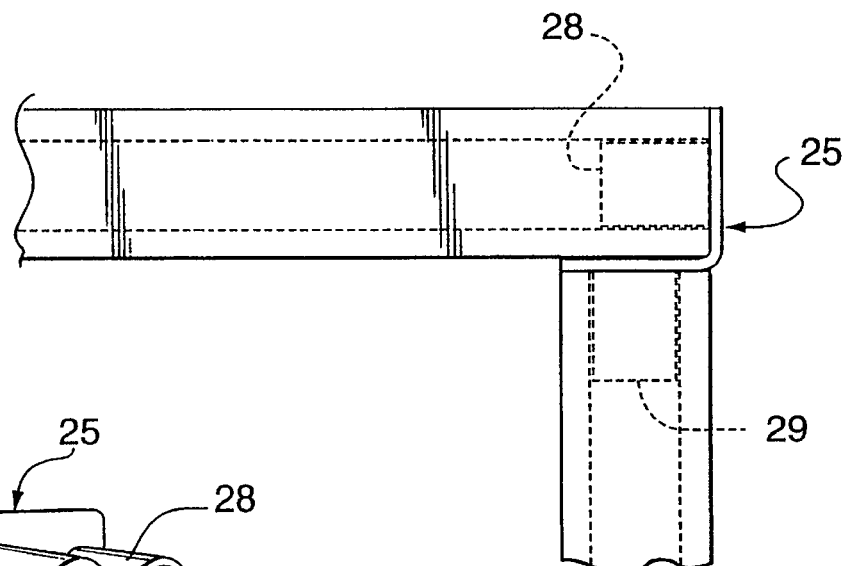
FIG. 7 is a side elevation showing a connector member joining two panels.
Figure 6:
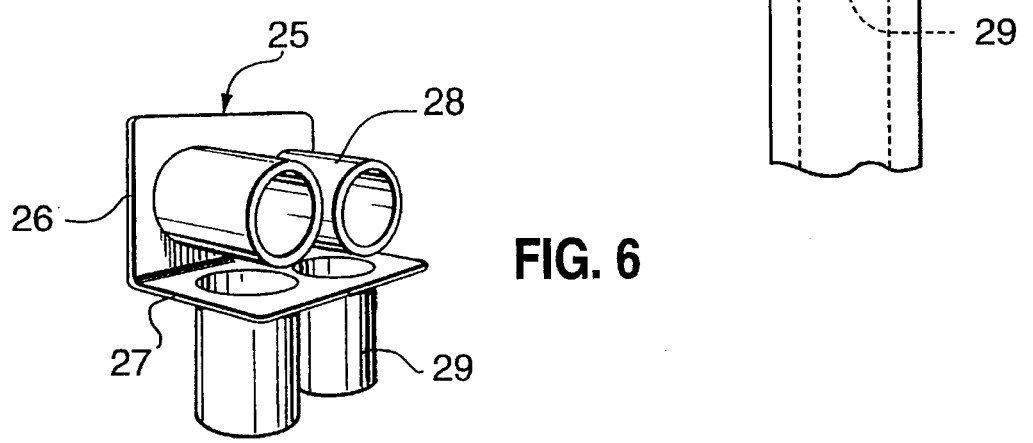
FIG. 6 is a perspective view of a connector member according to the invention.

A typical connector piece according to the present invention is illustrated in FIG. 6. This L-shaped connector piece 25 with arm portions 26 and 27. Tubular sleeves 28 and 29 extend from the arm portions 26 and 27 respectively. These tubular sleeves 28 and 29 are adapted to fit snugly within cylindrical holes 12 of the rigid cores 10 as shown in FIG. 7. These cylindrical sleeves 28 and 29 have the important advantage of providing a large contact area against the rigid core material, thereby providing a very strong connection.

Figure 8:
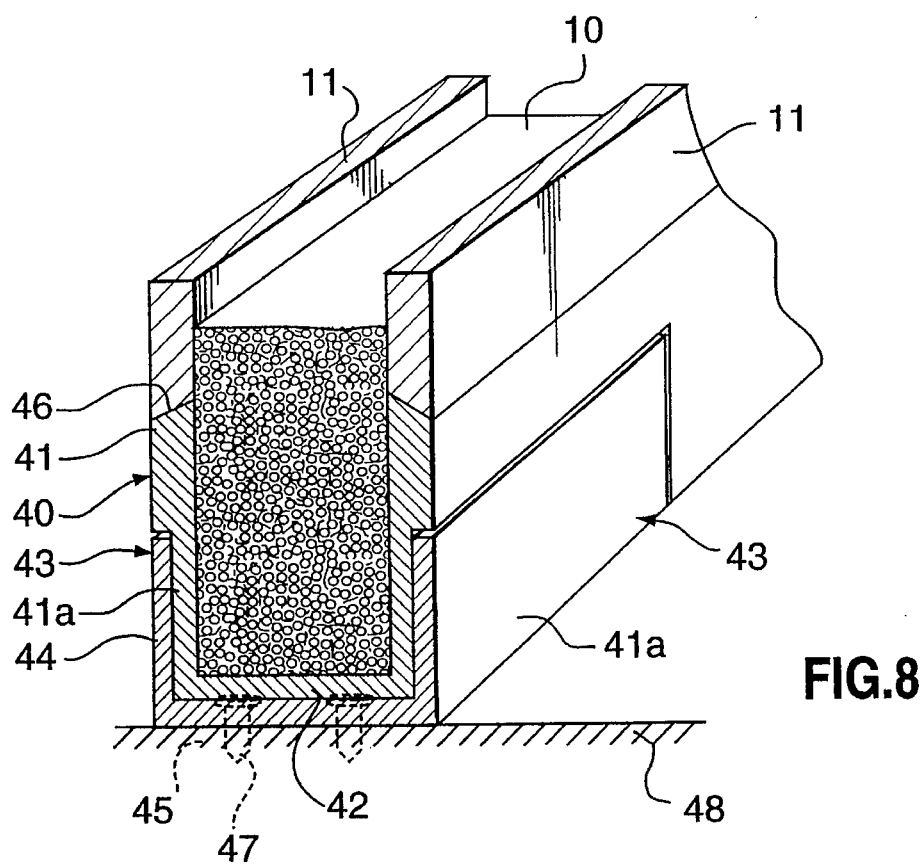
FIG. 8 is an isometric view of an edge member and connector shoe.

Particularly when the composite panels of this invention are used for interior partitions, it is advantageous to provide a strong and damage resistant strip or plate adjacent the floor. Such an arrangement is shown in FIG. 8 where a U-shaped edge piece 40 formed of fibreglass is used for form the end of a composite panel according to the invention. The U-shaped piece 40 include side leg portions 41 and a bottom portion 42 joined by 90° corners. The side leg portions 41 are joined to the gypsum panels 11 along tapered faces 46 and the U-shaped edge piece 40 and panels 11 are rigidly connected by being bonded to the core portion 10 formed within the gypsum panels 11 and the U-shaped edge piece 40. This edge piece 40 extends along the length of the partition wall adjacent the floor and provides a strong baseboard for the wall.

This design can also be utilized as a means for anchoring the bottom of a composite wall panel to a floor 48. For this purpose, U-shaped brackets 43 are formed of fibreglass and are screwed to the floor 48 by means of aluminum screws 47. The side legs 41 of the U-shaped edge piece 40 includes portions 41 of reduced thickness providing a recess along the length thereof adapted to receive the side legs 44 of the U-shaped floor bracket 43.

Figure 9:
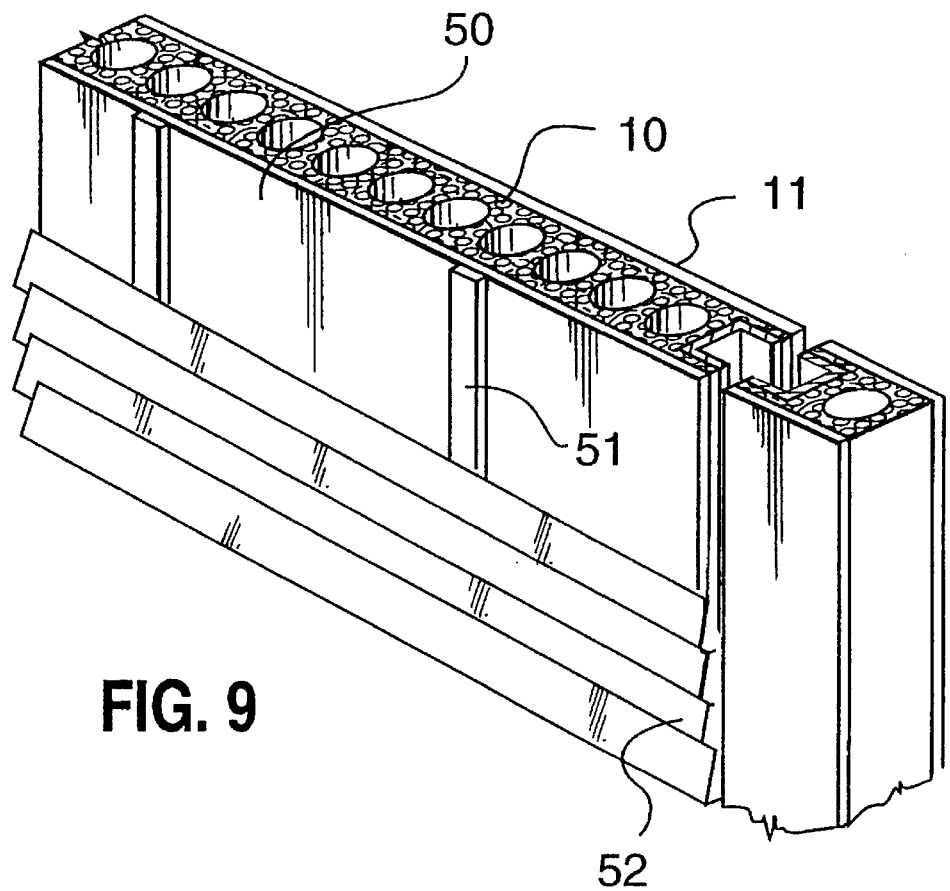
FIG. 9 is a perspective view showing an outer wall finish.

Details for an outside wall construction according to this invention are shown in FIG. 9. This includes a core of microspheres 10 having a commercial gypsum wallboard panel 11 on the inner face of the core and a fibreglass layer 50 bonded to the outer face of the core. This fibreglass layer typically contains 3 mm roving. Strapping 51 is fixed to the fibreglass layer 50 and these vertical straps provide an anchor for traditional exterior siding, e.g. aluminum or vinyl siding 52.

Figure 10:
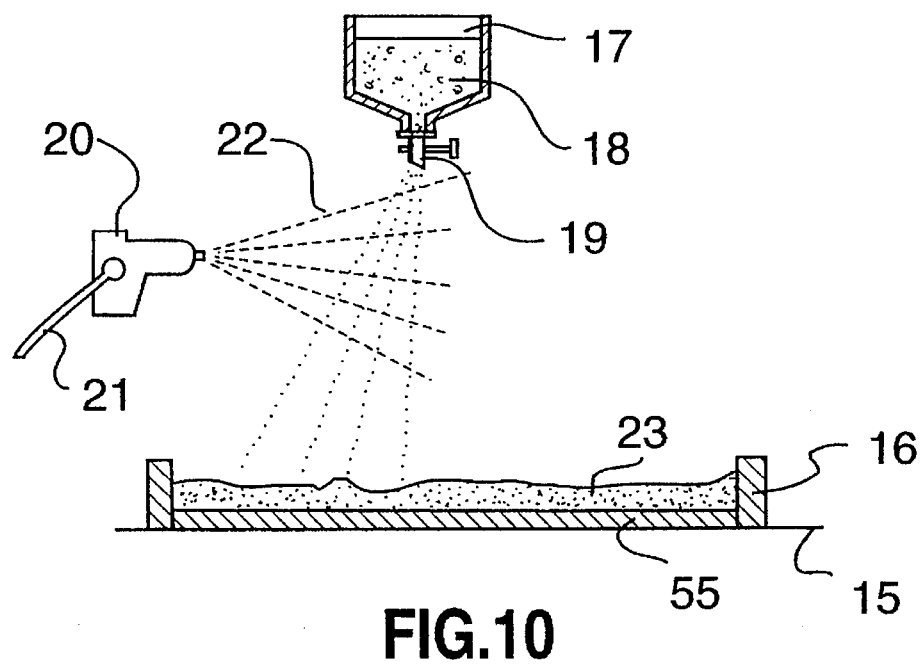
FIG. 10 is a schematic illustration of a manufacturing system.
Figure 11:
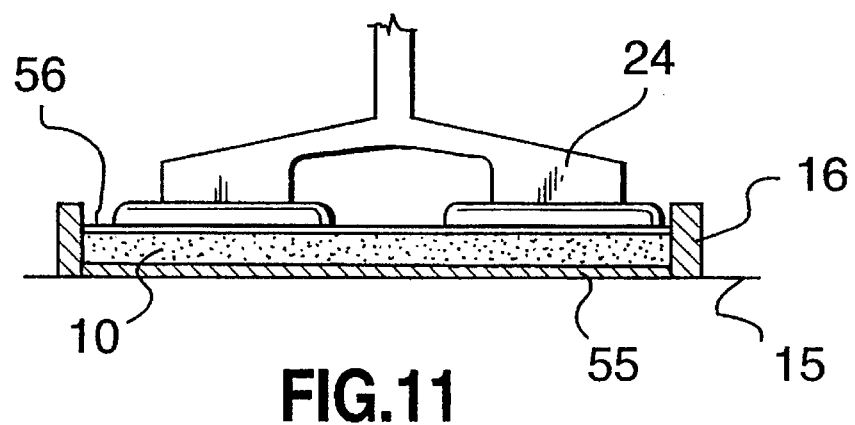
FIG. 11 is a schematic illustration of a vacuum press system.
Figure 12:
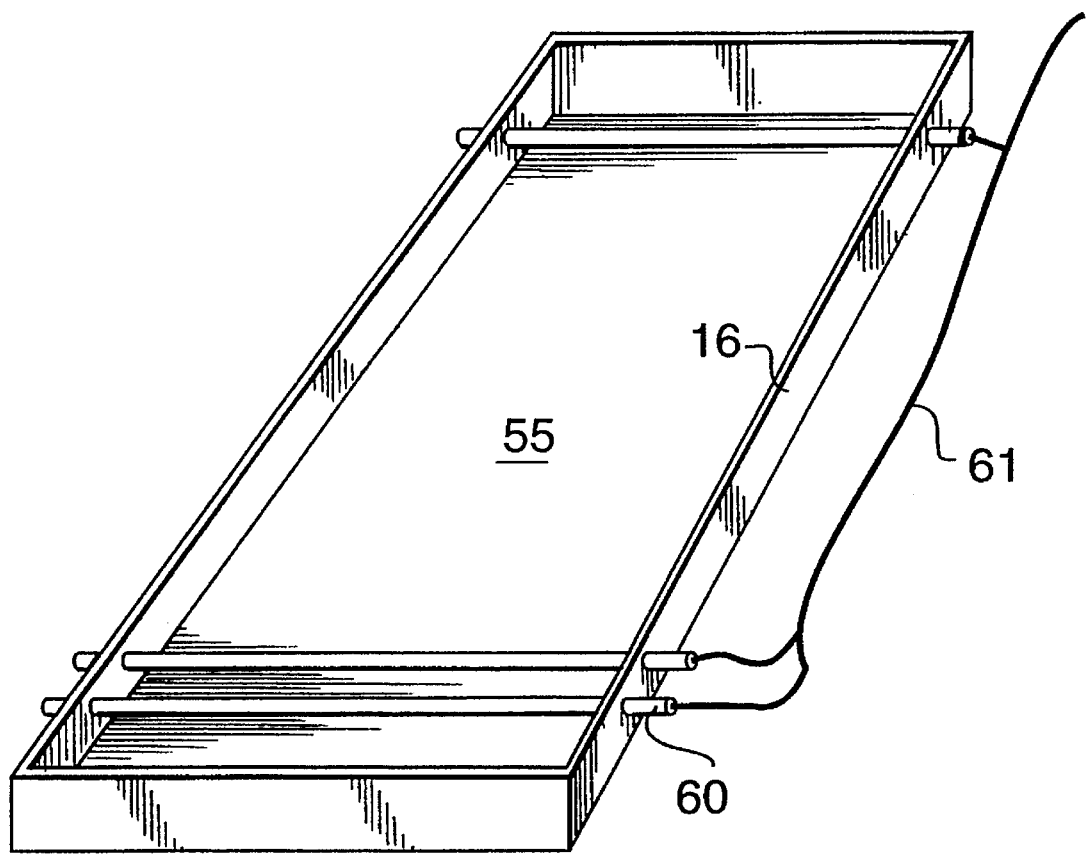
FIG. 12 is a perspective view showing collapsible hole-forming moulds.

A schematic illustration of a manufacturing system for the invention is shown in FIGS. 10–12. A press work table 15 is provided with edge members 16 defining the perimeter of a panel to be formed. Resting within this is a first lower panel 55 which may be gypsum wallboard or fibreglass. Ceramic or glass microspheres 18 as received from the manufacturer are stored in a hopper 17 and are dispensed through a dispensing device 19 so as to fall downwardly onto panel 55 within the confines of the perimeter 16. As the microspheres fall from the dispenser 19, they are intercepted by a fine spray 22 of a dilute bonding agent. This bonding agent is supplied from spray gun 20 via delivery line 21. This fine spray 22 individually coats the microspheres 18 such that free flowing coated microspheres 23 collect on the first gypsum panel 55. The work table 15 is vibrated while the coated microspheres 23 collect such that a uniform layer is formed within the perimeters 16. When a desired thickness of coated microspheres has been formed, the dispenser 19 and spray gun 20 are turned off and a second panel 56 of gypsum wallboard or fibreglass is placed on top of the free flowing coated microspheres 23. The panels 55 and 56 and layer of coated microspheres 23 are then pressed together under heating and vacuum by means of vacuum press 24 to form the fire-resistant, composite construction panel of the invention.

A preferred manufacturing technique is illustrated in FIG. 12. Here, a mould is formed by edge pieces 16. A lower panel 55 of gypsum wallboard or fibreglass is positioned as shown. Extending across and through opposing side walls 16 are a series of collapsible inflated plastic cylinders 60, these being connected to an air manifold 61 which is in turn connected to a compressor (not shown).

With the cylinders 60 inflated, binder-coated microspheres are pored into the mould and a top panel 56 placed in position as described in FIG. 11. The moulding of the panel is then continued as described above with the cylinders 60 still inflated by the compressor. After about 7 to 8 hours of curing, the pressure to the cylinders 60 is relaxed so that the cylinder 60 collapse and can be pulled out of the moulded panel to thereby provide a series of cylindrical holes without liners. After the tubes 60 have been removed, the formed panel can then be placed in a curing room for further curing.

Certain further preferred embodiments of this invention will now be illustrated by the following non-limiting examples.

EXAMPLE 1

The equipment as shown in FIGS. 10–12 was used to produce a composite construction panel according to the invention having a core thickness of 30 mm.

For this purpose, commercial gypsum wallboard panels were used having dimensions of about 120 cm×240 cm and a thickness of about 10 mm. The paper facing on one side of each gypsum panel was perforated with a large number of small hole extending through the paper and uniformly distributed over the entire surface of the panel. These perforations had a diameter of about 1 mm with about 20 perforations being provided in each 5 mm×5 mm area of the panel. One of these panels was placed in the location 55 of FIG. 10.

The hopper 17 was filled with Scotchlite® glass bubbles of the type B38/4000. These microspheres had an average particle density of 0.38 g/cc and a test pressure of 4000 psi. About 95% by weight of the microspheres had diameters less than 177 microns. These microspheres were dispensed downwardly from the dispensing device 19 while simultaneously being sprayed with a fine spray of adhesive from spray gun 20.

The adhesive used was Hysol® obtained from The Dexter Corporation. This adhesive as supplied by the manufacturer was diluted to about 35% by volume with benzene as solvent before being applied. The flow rates of the adhesive and the microspheres were adjusted so that the diluted adhesive was supplied in an amount of about 20% by volume based on the volume of microspheres being coated.

The press bed was vibrated while the coated microspheres were being dispensed so as to lay down a uniform bed of coated microspheres on the bottom gypsum wallboard panel. When the loosely deposited coated microspheres had built up to a required thickness, the spray gun 20 and dispenser 19 were turned off and the second gypsum wallboard panel 56 was placed over the loose coated microspheres and pressure was applied by a vacuum press 24. A pressure of below 40 psi was applied and the temperature was maintained below 90° C. Under these conditions, a cured composite panel was obtained after ½ hour.

EXAMPLE 2

Again using the equipment as shown in FIGS. 10–12, panels were formed of the type shown in FIG. 3. For this construction, each panel 11 had a length of 4.0 m, a width of 2.4 m and a thickness of 10 mm. The fibreglass tube 13 used as the joining tube had outside diameters of 60 mm and a wall thickness of 3 mm. The holes 12 had a diameter of 60 mm and were laterally spaced a distance of 100 mm (center line to center line) and the completed panels had a thickness of 100 mm. The two panels were connected together utilizing Hysol® epoxy adhesive.

EXAMPLE 3

Using the same technique as used in Examples 1 and 2, composite panels were formed as shown in FIGS. 4 and 5. The U-shaped edge piece 35 was formed of fibreglass having a wall thickness of 4 mm and an external length of 40 mm. The extruded fibreglass column 36 was 32 mm² with a thickness of 4 mm. The composite panels were joined using 4 mm diameter aluminum screws at a spacing of 250 mm along the length of the panel. After the aluminum screws had been inserted, the V-shaped gaps remaining were filled with gypsum putty to complete the assembly.

It is readily apparent from the above description of the invention that various modifications of the panels may be made within the scope of the invention. In addition, many modifications may be made in the particular form of apparatus used to perform the methods of the invention. Therefore, in view of all of the above, the invention is not to be limited to the specific details described herein, except as may be required by the following claims.

I claim:

1. A fire-resistant construction system comprising lightweight rigid panels forming structural walls, ceilings or partitions and connector members for joining the rigid panels to form a structure wherein (a) each rigid panel has substantial length and width relative to thickness and is formed of small ceramic or glass hollow microspheres having particle sizes of less than about 2 mm and a density of less than about 0.75 g/cc, said small microspheres being bonded together to form a rigid panel by means of a settleable binder material, and each panel also having a plurality of equally spaced holes formed therein and extending the full length of the panel, and (b) each connector member comprises an L-shaped member with each arm of said L-shaped member having tubular portions extending perpendicularly therefrom and being adapted to fit snugly within the holes of the rigid panels.

2. A construction system according to claim 1 wherein the rigid panel has a thickness of about 5–15 cm.

3. A construction system according to claim 1 wherein the holes in the rigid panels are cylindrical.

4. A construction system according to claim 3 wherein there is at least 2 cm of rigid panel material between each hole and the face of a panel.

5. A construction system according to claim 3 wherein the cross-sectional area of the holes in a panel comprise at least 25% of the total cross-sectional area of a panel.

6. A construction system according to claim 1 wherein the rigid panels have a density of about 10 to 25 pounds per cubic foot.

7. A construction system according to claim 1 wherein a gypsum wallboard is bonded to at least one face of a rigid panel.

8. A construction system according to claim 1 wherein a fibreglass sheet is bonded to at least one face of a rigid panel.

9. A construction system according to claim 3 wherein the settleable binder material comprises a thin coating on the outer surfaces of the microspheres and bonds together contacting microspheres to form a light, rigid structure.

10. A construction system according to claim 3 wherein the settleable binder material is an organic resin binder.

11. A construction system according to claim 3 wherein the settleable binder material is a thermosetting resin binder.

12. A construction system according to claim 3 wherein the settleable binder material is an epoxy adhesive.

13. A construction system according to claim 10 wherein the resin is a polyester resin.

14. A construction system according to claim 3 wherein the settleable binder is a urea-based adhesive.

15. A construction system according to claim 3 wherein the microspheres are glass microspheres having an average particle density in the range of about 0.15–0.6 g/cc and particle diameters in the range of about 10–200 μm.

16. A construction system according to claim 15 wherein the microspheres have average wall thicknesses in the range of about 0.5–2.0 μm.

17. A construction system according to claim 16 wherein the microspheres have compressive strengths in the range of 250–10,000 psi.

18. A construction system according to claim 1 wherein the connector members are formed of plastic.

19. A construction system according to claim 1 wherein the connector members are formed of fibreglass.

20. A construction system according to claim 1 wherein the connector members are formed of metal.

21. A construction system according to claim 1 wherein a rigid panel for use as a ceiling structure contains steel reinforcing bars embedded therein.

22. A construction system according to claim 21 wherein the reinforcing bars are spaced about 12 to 20 cm.

23. A process for producing a fire-resistant, composite construction panel having a rigid core formed of bonded together small ceramic or glass hollow microspheres and cladding layers bonded to the opposed faces of said core, comprising the steps of placing a first cladding layer in a press mould, arranging in said mould a series of equally spaced inflated plastic tubes, said tubes forming regular cylinders under inflation and collapsing flat when deflated, dispensing onto said first cladding layer a layer of free flowing small ceramic or glass hollow microspheres, said microspheres being coated with a settable binder material, placing a second cladding layer on top of the layer of coated microspheres, pressing the first and second cladding layers and layer of coated microspheres together and curing the binder material while pressing to form the composite construction panel, and deflating and removing the plastic tubes to form a panel having a series of equally spaced cylindrical holes extending therethrough.

24. A process according to claim 23 wherein said microspheres are dispensed by falling from a dispenser through a spray of settable binder material, whereby the microspheres are coated with binder material before collecting on the first cladding layer.

25. A process according to claim 23 wherein said microspheres are coated with a settable binder material in a separate operation and said coated microspheres are dispensed by falling from a dispenser.

26. A process according to claim 23 wherein the composite is compressed under vacuum to form a rigid core of bonded microspheres.

27. A process according to claim 26 wherein the binder material is a thermosetting resin binder.

28. A process according to claim 26 wherein the binder material is an epoxy adhesive.

29. A process according to claim 26 wherein the resin is a polyester resin.

30. A process according to claim 26 wherein the binder material is a urea-based adhesive.

31. A process according to claim 23 wherein the microspheres have diameters of less than 2 mm.

32. A process according to claim 31 wherein the microspheres have a density of less an 0.75 g/cc.

* * * * *